United States Patent [19]

Stahl et al.

[11] Patent Number: 4,516,763
[45] Date of Patent: May 14, 1985

[54] METHOD AND APPARATUS FOR SINGULARIZING STACKED X-RAY FILMS OR THE LIKE

[75] Inventors: Werner Stahl, Kirchheim-Heimstetten; Jürgen Müller, Munich, both of Fed. Rep. of Germany

[73] Assignee: Agfa-Gevaert Aktiengesellschaft, Leverkusen, Fed. Rep. of Germany

[21] Appl. No.: 470,178

[22] Filed: Feb. 28, 1983

[30] Foreign Application Priority Data

Mar. 30, 1982 [DE] Fed. Rep. of Germany ....... 3211610

[51] Int. Cl.³ .............................................. B65H 5/08
[52] U.S. Cl. ..................................... 271/11; 271/102; 271/107; 271/268
[58] Field of Search ..................... 271/11, 12, 93, 102, 271/103, 107, 265, 110, 111

[56] References Cited

U.S. PATENT DOCUMENTS

| 2,591,116 | 4/1952 | Backhouse | 271/108 |
| 3,466,028 | 9/1969 | Bays | 271/11 |
| 3,938,800 | 2/1976 | Wirz | 271/93 |
| 4,132,401 | 1/1979 | Gauronski | 271/265 X |
| 4,218,054 | 12/1977 | Bauer | 271/11 |
| 4,382,593 | 5/1983 | Beran | 271/93 X |

FOREIGN PATENT DOCUMENTS 2403469  1/1973  Fed. Rep. of Germany.

*Primary Examiner*—Richard A. Schacher
*Attorney, Agent, or Firm*—Peter K. Kontler

[57] ABSTRACT

The leaders of successive topmost sheets of a stack of sheets are lifted by a set of aligned suction cups which move each leader into a horizontal plane including the nip of two advancing rolls. The suction cups insert the leading edge of each leader into the nip and continue to adhere to the leader while the latter is advanced by the rolls so that the leader pulls the suction cups against the opposition of a weak spring tending to move the suction cups and their mobile support to a starting position. The drive for the advancing rolls is thereupon arrested for an interval of time which suffices to ensure the collapse of suction in the cups by arresting the suction pump and by simultaneously opening a valve which connects the interior of each cup with the atmosphere.

21 Claims, 2 Drawing Figures

METHOD AND APPARATUS FOR SINGULARIZING STACKED X-RAY FILMS OR THE LIKE

CROSS-REFERENCE TO RELATED CASE

The method and apparatus of the present invention are related to the method and apparatus which are disclosed in our commonly owned copending patent application Ser. No. 476,588 filed Mar. 18, 1983 for "Apparatus for manipulating stacked X-ray films or the like".

BACKGROUND OF THE INVENTION

The present invention relates to a method and apparatus for manipulating stacked sheets, especially X-ray films, and more particularly to improvements in a method and apparatus for converting a stack of superimposed sheets into a succession of discrete sheets. Still more particularly, the invention relates to improvements in a method and apparatus for transferring successive outermost sheets from a source of stacked sheets to a transporting unit which accepts discrete sheets one after the other and advances such sheets to a cassette or to another destination.

German Offenlegungsschrift No. 24 03 469 discloses an apparatus for conversion of a stack of sheets into a succession of discrete sheets. Successive outermost sheets of the stack are attracted by a row of suction cups which are mounted on a rod-shaped carrier. In order to remove the outermost (uppermost) sheet of a stack of superimposed sheets, the suction cups are lowered simultaneously at right angles to the plane of and against the leader of the outermost sheet. In the next step, the suction cups are tilted to thereby lift the leader of the outermost sheet and to thus permit air to penetrate between the underside of the outermost sheet and the upper side of the next-to-the-outermost sheet. The suction cups are thereupon lifted a short distance and tilted back so that their orientation matches that during initial attraction of the leader of the outermost sheet. In an additional step, the suction cups are caused to move the leader forwardly (in its plane) and into the nip of advancing rolls forming part of the sheet transporting unit. Suction in the cups is caused to collapse after the leader of the removed outermost sheet has entered the nip of the advancing rolls, i.e., the suction cups are then supposed to release the sheet.

A drawback of the just described conventional apparatus is that suction in the cups cannot be caused to collapse instantaneously, i.e., the suction cups continue to adhere to the leader of the freshly transferred or singularized outermost sheet for a certain period of time following entry of the foremost part (leading edge) of the transferred sheet into the nip of the rotating (driven) advancing rolls. This invariably entails at least some slippage of advancing rolls with reference to the leader and/or some slippage of the leader relative to the suction cups. Slippage of the leader relative to the suction cups and/or slippage of advancing rolls with reference to the leader entails damage to and/or defacing of the sheet, especially if the sheet constitutes a film, such as X-ray film. Furthermore, slippage of the advancing rolls relative to the leader can entail improper delivery of the sheet to the next station, i.e., the arrival of such sheet at the next station is delayed by an unpredictable interval of time whose duration depends on several variable parameters such as maximum suction in the cups, the surface finish of the sheets, the area of contact between each suction cup and the sheet, the finish of the peripheral surfaces of the advancing rolls, the force with which the rolls are urged toward each other, and/or others.

OBJECTS AND SUMMARY OF THE INVENTION

An object of the invention is to provide a novel and improved method of singularizing stacked sheets, such as X-ray films, without any damage and/or defacing of the sheets.

Another object of the invention is to provide a method which ensures highly predictable and accurately reproducible transfer of successive outermost sheets to a station where the sheets are supposed to arrive in predetermined orientation and/or at preselected intervals and/or with a predetermined delay following the start of their removal from the stack.

An additional object of the invention is to provide a method which prevents simultaneous pronounced exertion of tensional stresses upon a sheet in different directions.

Another object of the invention is to provide a method which can be practiced for predictable and gentle singularizing of large, small, narrow, wide, short, long, heavy, lightweight, smooth, coarse-finish, readily flexible and/or reasonably stiff sheets at a high or low frequency and at regular or irregular intervals.

A further object of the invention is to provide a novel and improved apparatus for the practice of the above outlined method.

Still another object of the invention is to provide an apparatus which is constructed and assembled in such a way that the lack of predictability of the duration of intervals which elapse during the venting of suction cups or analogous suction-operated sheetengaging and attracting elements cannot adversely affect the condition of singularized sheets and/or the predictability of transport of sheets to the next location, e.g., into a cassette for X-ray films.

A further object of the invention is to provide the apparatus with novel and improved means for synchronizing the movements of various mobile components and/or units so as to ensure that the transporting unit will advance a freshly delivered sheet only when such movement is not excessively opposed by the element or elements which are used to deliver sheets from a stack or another source of supply to the transporting unit.

Another object of the invention is to provide the apparatus with a novel and improved sheet singularizing unit.

An additional object of the invention is to provide the apparatus with novel and improved controls for the drive means of the sheet transporting unit, for the drive means of the sheet singularizing unit, and for the means which establish and eliminate subatmospheric pressure in the suction cups.

One feature of the invention resides in the provision of an apparatus for transferring successive outermost sheets from a stack of sheets into a predetermined plane, particularly for transferring X-ray films into a cassette or the like. The apparatus comprises a magazine or another suitable source of stacked sheets, transporting means which is operable to advance successive sheets in the predetermined plane, and singularizing means including a mobile support, at least one suctionoperated transfer element which is mounted on the support, and means for moving the support between at least one first position in which the transfer element can attract a portion of the outermost sheet of the stack in the source and a plurality of second positions in some of which the transfer element maintains the aforementioned portion of the thus attracted sheet in the predetermined plane. The transporting means includes means for engaging and advancing the aforementioned portion of a sheet in the predetermined plane in at least one second position of the support.

The advancing means of the sheet transporting means preferably comprises at least one pair of rotary members defining a nip which is located in the predetermined plane, and the transporting means further comprises drive means for at least one of the rotary members.

The moving means of the singularizing means preferably includes means for maintaining the transfer element in one and the same predetermined orientation with reference to the predetermined plane and with reference to the advancing means in each second position of the support. The moving means preferably further comprises means for yieldably biasing the support (and hence the transfer element) to a predetermined second position which can be said to constitute the starting position of the support and of the transfer element. The arrangement is preferably such that the distance between the transfer element and the advancing means of the transporting means in the aforementioned predetermined second position of the support is greater than in any other second position of the support.

The singularizing means preferably comprises a plurality of aligned transfer elements each of which comprises at least one suction cup, and the support preferably comprises at least two sections one of which is movable relative to the other section to thereby enable the support to assume the plurality of second positions. The aforementioned biasing means preferably comprises one or more coil springs or other suitable resilient means acting upon the one section to urge the latter to a position corresponding to the predetermined second position of the support. The other section of the support can include an elongated guide rail, and the one section is preferably shiftable lengthwise of the rail.

The apparatus preferably further comprises means for monitoring the region of the aforementioned nip of the advancing means for the presence or absence of sheets. The aforementioned portion of the sheet in the predetermined plane is oriented in such a way that its leading edge is located in the nip of the advancing means in the one second position of the support, and the monitoring means is arranged to detect the presence or absence of the leading edge of such sheet portion. The monitoring means preferably comprises a light-sensitive detector, particularly a detector which is designed for use in non-actinic light.

The rotary members of the advancing means preferably define at least one gap which can accommodate at least a portion of the monitoring means. For example, each of the rotary members can comprise a pair of spaced-apart coaxial rolls and the aforementioned gap can be disposed between the rolls of such pairs.

The apparatus can further comprise control means for arresting (preferably for a predetermined interval of time) the drive means for the advancing means of the transporting means in response to detection of the leading edge of a sheet by the monitoring means. The singularizing means preferably further comprises suction generating means (e.g., a pump) which is activatable to draw air from the transfer elements and aerating means (e.g., a valve) which is activatable to admit air into the transfer elements, and the control means preferably further comprises means for activating the aerating means simultaneously with deactivation of the suction generating means in response to detection of the leading edge of a sheet by the monitoring means. The interval during which the drive means for the advancing means of the transporting means is temporarily arrested by the control means in response to detection of the leading edge of a sheet by the monitoring means preferably suffices to ensure that the transfer elements are disengaged from the sheet in the predetermined plane as a result of activation of the aerating means simultaneously with deactivation of the suction generating means. The predetermined plane may but need not be at least substantially horizontal.

Another feature of the invention resides in the provision of a method of transferring successive outermost sheets from a stack of sheets into a predetermined plane, particularly of transferring X-ray films. The method comprises the steps of establishing a stack of sheets, attracting portions of successive outermost sheets of the stack by several suction cups, moving the suction cups so as to transfer the aforementioned portions of successive outermost sheets into the predetermined plane, moving the portions of successive sheets in the predetermined plane by way of the suction cups including maintaining the suction cups in a predetermined orientation with reference to the predetermined plane, transporting the portions of successive outermost sheets in the predetermined plane while the suction cups continue to adhere to the portions of the sheets so that the suction cups are moved by the sheets, interrupting the transporting step for a predetermined interval of time, and disengaging the suction cups from the sheet portion in the predetermined plane during such interval of time.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
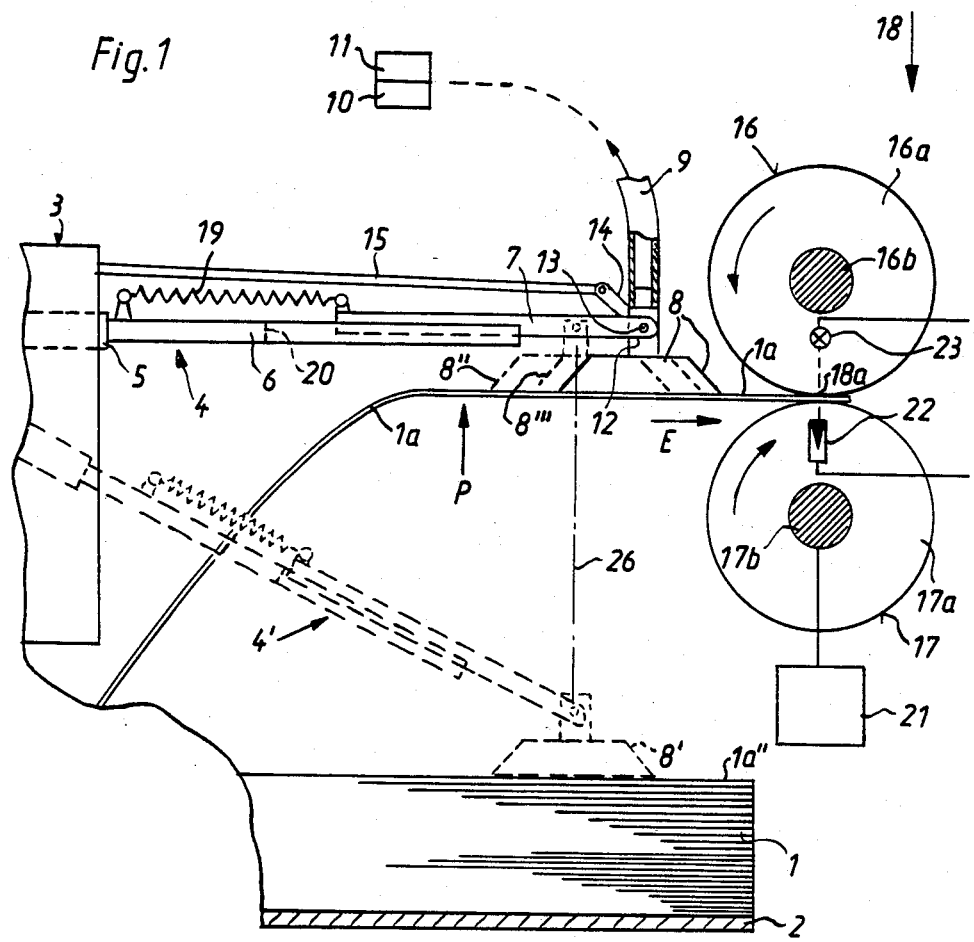
FIG. 1 is a fragmentary schematic partly elevational and partly sectional view of an apparatus which embodies one form of the invention.

Referring to FIG. 1, there is shown an apparatus which is utilized to convert a stack 1 of superimposed sheets 1a into a succession or series of discrete sheets. The sheets 1a are supposed to constitute X-ray films, and the source of sheets is a magazine having a bottom plate or platform 2 which supports the lowermost sheet of the stack 1. The magazine including the platform 2 is located in the interior of a dark chamber (not shown) wherein successive outermost (topmost) sheets 1a of the stack 1 are transferred into a cassette (not shown) for X-ray films. In addition to the source of superimposed sheets 1a, the apparatus further comprises a sheet transporting unit 18 and a sheet singularizing unit. The latter comprises a plurality of suction-operated sheet transfer elements 8, a mobile support 4 for the elements 8 (each of which includes or constitutes a suction cup), and a device 3 for moving the support 4 between at least one first position (shown at 4') in which the suction cups 8 can engage and attract the leader 1a' of the outermost sheet 1a of the stack 1 on the platform 2, and several second positions in some of which the suction cups 8 maintain the leader 1a' in a predetermined plane P, namely, in a preferably horizontal plane which includes the nip 18a of two parallel advancing rolls 16, 17 forming part of the transporting unit 18.

The support 4 is pivotable about a fixed or shiftable horizontal axis (not shown) which is parallel to the axes of the advancing rolls 16, 17 and this support includes a first section 5 composed of one or more elongated parallel rails (which are pivotable about the aforementioned axis) and a second section 6 including one or more elongated rails which are movable lengthwise of the respective rails of the section 5. The means for pivoting the section 5 about the horizontal axis and (if necessary) for shifting the horizontal axis in the plane P includes a system of levers and links and/or cams and followers (not specifically shown) which form part of the moving device 3 and may be of the type disclosed in our aforementioned commonly owned copending application Ser. No. 476,588 filed Mar. 18, 1983.

The section 6 supports a third section or holder 7 including one or more elongated strips or bars which are reciprocable lengthwise of the respective rails of the section 6 and whose free end portions carry a transversely extending bar 12 for the suction cups 8. The singularizing means of the improved apparatus further comprises a pump 10 or another suitable suction generating device which is activatable to evacuate air from the suction cups 8, as well as a valve 11 or another suitable aerating device which can be activated to connect the interior of each of the suction cups 8 with the atmosphere. Conduits 9 (preferably in the form of flexible hoses) are provided to connect the suction cups 8 with the pump 10 or with the valve 11.

The suction cups 8 are disposed one after the other, as viewed in FIG. 1. The singularizing means can comprise two or more preferably identical suction cups 8 which perform identical movements relative to as well as together with the support 4. The row of two or more aligned suction cups 8 extends at right angles to the direction of advancement of successive sheets 1a in the plane P under the action of the suction cups or under the action of the advancing rolls 16 and 17. The drive which forms part of the transporting unit 18 and serves to intermittently rotate the shaft 17b for the lower advancing roll 17 through increments or angles of predetermined magnitude is shown schematically at 21.

By way of example, each of the sections 5, 6 can comprise two spaced parallel rails, the section or holder 7 can comprise two spaced parallel strips or bars, and the suction cups 8 are then disposed in the space between the free or outer (right-hand) ends of the strips or bars constituting the holder 7. The end portions of the bar 12 constitute or carry shafts 13 which are rotatably mounted in the outer ends of the respective strips forming part of the holder 7.

The bar 12 is rigidly connected to or made integral with an arm 14 which can be rocked by a pull rod 15 of the moving device 3 to thereby change the orientation of the suction cups 8 with reference to the support 4 by turning the bar 12 about the common axis of the shafts 13. Turnability of the bar 12 with the suction cups 8 is desirable because this enables the suction cups to retain their orientation with reference to the plane P and with reference to the planes of sheets forming the stack 1 during the initial stage of lifting of the leader 1a' of the outermost sheet 1a above and away from the next-to-the outermost sheet, namely, during the initial stage of movement of the support 4 from the first position 4' to one of the second positions. Lifting of the leader 1a' above and away from the next-to-the-outermost sheet of the stack 1 is followed by turning of the bar 12 so that the plane of the lifted leader 1a' is inclined with reference to the plane P, and the suction cups 8 are then turned back so that the leader 1a' is moved into the plane P not later than when the support 4 reaches its first second position. The suction cups 8 are turned first in a counterclockwise direction (as viewed in FIG. 1) in order to allow for penetration of air between the lifted leader 1a' of the outermost sheet 1a and the leader of the sheet therebelow, and thereupon in a clockwise direction. The rod 15 can be moved back and forth by a follower (not shown) which tracks the periphery or extends into an endless groove of one of the aforementioned cams.

In accordance with a feature of the invention, the moving device 3 for the support 4 includes means for yieldably biasing the holder or section 7 against a stop 20 which is provided on the section 6. When the left-hand end of the holder 7 abuts against the stop 20 and the section 5 is horizontal (as shown in FIG. 1 by solid lines), the support 4 assumes a predetermined (starting) second position in which the distance between the suction cups 8 and the advancing rolls 16, 17 of the transporting unit 18 is greater than in any other second position of the support. The illustrated biasing means comprises at least one resilient element in the form of a coil spring 19 which is connected to the section 6 and holder 7 to urge the latter in a direction to the left, as viewed in FIG. 1, i.e., into abutment with the stop 20.

The advancing roll 17 drives the companion roll 16 counterclockwise when the shaft 17b is rotated by the drive 21 to rotate the roll 17 in a clockwise direction. When the front portion or leading edge 1a'' of a leader 1a' has entered the nip 18a and the drive 21 rotates the shaft 17b, the leader 1a' advances in the plane P in the direction which is indicated by the arrow E. If desired, the shaft 16b of the advancing roll 16 can be driven by a discrete second drive (not shown) in synchronism with the shaft 17b, the shaft 16b can be positively driven in lieu of the shaft 17b, or the drive 21 can be connected with the shaft 17b as well as with the shaft 16b.

Each of the advancing rolls 16, 17 is composed of a series of coaxial shorter rolls (16a and 17a) which define between themselves at least one gap serving to accommodate a portion of or an entire monitoring device including a light source 23 (between two neighboring rolls 16a) and a photoelectronic transducer 22 (between two neighboring rolls 17a). The purpose of the monitoring device including the components 22 and 23 is to detect the presence or absence of sheets 1a in or in the region of the nip 18a of the advancing rolls 16 and 17. The combined axial length of the rolls 16a or 17a (inclusive of the gap or gaps therebetween) may but need not exceed the maximum width of a sheet 1a (as measured at right angles to the plane of FIG. 1), i.e., such combined axial length need not exceed the length of an edge 1a'. In the illustrated embodiment, the light source 23 of the monitoring device emits a beam of non-actinic light in a vertical plane including the nip 18a and the axes of the shafts 16b, 17b.

Figure 2:
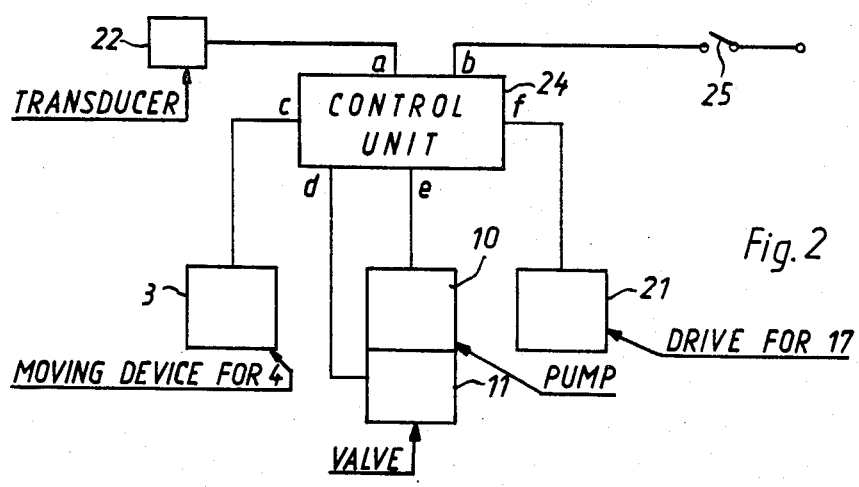
FIG. 2 is a block diagram of the control system for mobile units and certain other components of the apparatus which is shown in FIG. 1.

FIG. 2 shows an electronic control unit 24 which has a first input a for signals from the transducer 22, a second input b for signals from a starter switch 25, a first output c for transmission of signals to the moving device 3 of the singularizing unit, a second output d for transmission of (activating or deactivating) signals to the aerating valve 11, a third output e for the transmission of (activating or deactivating) signals to the pump 10, and a fourth output f for the transmission of "start" or "stop" signals to the drive 21 of the transporting unit 18. The exact details of the control unit 24 form no part of the invention; all such parts of the control unit which are essential or desirable for proper operation of the improved apparatus will be mentioned below.

The operation is as follows:

It is assumed that the apparatus is idle and that the support 4 is maintained in the predetermined (starting) second position in which its sections 5, 6, 7 are at least substantially horizontal and the section or holder 7 abuts against the stop 20 of the section 6 under the bias of the coil spring 19. The operator or an automatic initiator (not shown) then transmits to the input b of the control unit 24 a signal (by closing the switch 25) to proceed with the transfer of the outermost or topmost sheet 1a of the stack 1 into the plane P and into the nip 18a of the advancing rolls 16, 17. The output c then transmits a "start" signal to the moving device 3 of the singularizing unit and the output e transmits an activating signal to the suction pump 10. The valve 11 is deactivated (closed), i.e., it does not allow air to enter the suction cups 8 via conduit means 9. The output f transmits a "start" signal to the drive 21 so that the advancing rolls 16, 17 begin to rotate in the directions indicated by arrows.

The device 3 begins to move the support 4 from the predetermined second position (in which the holder 7 abuts against the stop 20 of the section 6) toward the first position 4' whereby the bar 12 moves vertically downwardly while the rod 15 cooperates with the arm 14 and bar 12 to maintain the suction cups 8 in horizontal positions. The coil spring 19 stores energy because the holder or section 7 moves away from the stop 20 of the section 6. The path of downward movement of the bar 12 is indicated by the vertical phantom line 26.

As soon as the suction cups 8 reach the positions 8', they attract the upper side of the leader 1a' of the outermost sheet 1a of the stack 1. It is desirable and advantageous to ensure that the suction cups 8 engage and attract all sizes of sheets 1a at a predetermined distance from their leading edges 1a". This can be readily accomplished by the simple expedient of placing the right-hand edge face of the stack 1 flush with the right-hand edge face of the platform 2; the moving device 3 takes care of the rest by invariably moving the support 4 to the aforementioned predetermined second position (in which the section 5 is horizontal and the coil spring 19 maintains the holder 7 in abutment with the stop 20) and by thereupon moving the bar 12 along the vertical path 26 in response to closing of the switch 25. The movement of the bar 12 along the vertical path 26 is made possible by slidable telescoping of sections 6 and 7 into the sections 5 and 6, respectively, and such movement is caused by the aforediscussed cam and follower means of the moving device 3.

Once the suction cups 8 attract the upper side of the leader 1a' of the outermost sheet 1a of the stack 1 on the platform 2 (in the first position 4' of the support 4), the device 3 moves the suction cups 8 upwardly (from the positions 8' to the positions 8") so that the coil spring 19 can dissipate at least some energy by moving the section or holder 7 along the section 6 and toward the section 5 of the support 4. During movement of the suction cups 8 from the positions 8' to the positions 8", the rod 15 causes the arm 14 to turn the bar 12 first in a counterclockwise direction (so that the leader 1a' of the uppermost sheet 1a is reliably separated from the leader of the sheet therebelow) and thereupon in a clockwise direction (so that the lifted leader 1a' is moved into the plane P when the suction cups 8 reach the positions 8"). The leading edge 1a" of the leader 1a' in the plane P is then parallel to the axes of the shafts 16b and 17b. The plane of the lifted leader 1a' is parallel to the planes of sheets 1a in the stack 1.

When the suction cups 8 reach the positions 8", the leading edge 1a" of the lifted leader 1a" is located to the left of the nip 18a, as viewed in FIG. 1, i.e., the leader 1a' is yet to be engaged and entrained by the advancing rolls 16, 17 to move in the direction of arrow E. This is accomplished by the device 3 which thereupon moves the section 6 of the support 4 with reference to the section 5 (again by one of the aforementioned cam and follower means) so that the leading edge 1a" of the lifted leader 1a' enters the nip 18a of the advancing rolls 16, 17 when the suction cups 8 reach the positions 8"', i.e., in an intermediate second position of the support 4.

When the leading edge 1a" enters the nip 18a, the lifted leader 1a' is moved in the direction of the arrow E (in the plane P) by the rolls 16, 17 and the leader 1a' entrains the suction cups 8 to the solid-line positions because the suction cups continue to adhere to the upper side of the moving leader and cause the holder 7 to slide along the section 6 against the opposition of the spring 19. The bias of this spring is weak or very weak; it barely suffices to return the holder 7 into abutment with the stop 20 (this is the predetermined second position of the support 4) when the suction cups 8 cease to attract the leader 1a' in the plane P. Such minute bias cannot cause the leader 1a' to slide relative to the peripheral surfaces of the advancing rolls 16, 17 (and/or vice versa) and/or the leading edge 1a" to move out of a position of exact parallelism with the axes of the shafts 16b and 17b. The holder 7 can begin to slide relative to the section 6 (against the opposition of the spring 19) even before the cups 8 reach the positions 8"', namely, as soon as the leading edge 1a" begins to move under the action of the advancing rolls 16 and 17. Thus, the cam and follower means of the device 3 can move the section 6 relative to the section 5 simultaneously with movement of the holder 7 with reference to the section 6 against the opposition of the spring 19.

The transducer 22 of the monitoring device transmits a signal to the input a of the control unit 24 as soon as the leading edge 1a" interrupts the light beam issuing from the source light 23. The control unit 24 then arrests the drive 21 (if necessary, with a slight delay following the transmission of a signal to the input a), the control unit also arrests the moving device 3, the control unit deactivates the pump 10, and the control unit activates (opens) the aerating valve 11. Thus, suction in the cups 8 collapses instantaneously or very rapidly as soon as the transducer 22 transmits a signal to the input a of the control unit 24. This means that the leader 1a' in the plane P is then free to advance under the action of the rolls 16, 17 and the spring 19 is free to return the holder 7 into abutment with the stop 20.

The control unit 24 thereupon starts the drive 21 after a preferably adjustable interval of time (such interval can be selected by appropriate setting of a timer clock in the unit 24) which suffices to ensure that suction in the cups 8 collapses completely before the rolls 16, 17 begin to advance the leader 1a' in the plane P and relative to the suction cups. The transducer 22 transmits a signal to the input a of the control unit 24 to stop the drive 21 as soon as the trailing end of the lifted sheet advances beyond the light beam issuing from the source 23. The apparatus is then ready to begin with the transport of the next sheet in response to renewed closing of the switch 25. The support 4 reassumes its predetermined second position (in which the holder 7 abuts against the stop 20 and the suction cups 8 dwell in the positions 8") not later than or immediately after the transducer 22 transmits a signal denoting that it is again exposed to light issuing from the source 23.

As mentioned above, the improved apparatus can manipulate large, small, wide, narrow, short or long sheets with the same degree of accuracy as long as the right-hand edge face of the stack 1 is flush with the right-hand edge face of the platform 2. Moreover, the monitoring means including the components 22, 23 can be used to detect if the nip 18a contains two or more coherent sheets. Thus, if the sheets 1a are transparent or translucent films, the intensity of light issuing from the source 23 and/or the sensitivity of the transducer 22 can be readily selected in such a way that the intensity of signals which are generated by the transducer 22 while the nip 18a contains two or more superimposed sheets is so weak that it causes the control unit 24 to automatically arrest the drive 21 and/or activate an alarm device for the generation of visible and/or audible signals which warn the operator that the apparatus requires attention, i.e., manual separation of sheets between the advancing rolls 16 and 17.

An important advantage of the improved method and apparatus is that the suction cups 8 have ample time to become separated from a sheet 1a whose leader 1a' is located in the plane P because the control unit 24 can be set to arrest the drive 21 for an interval of time which invariably suffices to cause the subatmospheric pressure in the cups 8 to collapse before the advancing rolls 16, 17 are started again for the purpose of advancing the entire sheet 1a beyond the nip 18a. The just discussed mode of operation guarantees that the peripheral surfaces of the advancing rolls 16, 17 cannot slip with reference to the sheets 1a, and that the sheets cannot and need not slip with reference to the suction cups 8 while the cups adhere or tend to adhere to the sheets. The aforediscussed multi-stage transfer of sheets 1a from the stack 1 beyond the nip 18a further ensures that the leading edge 1a" of each sheet remains parallel to the axes of the shafts 16b, 17b as long as such leading edge is aligned with the right-hand edge face of the platform 2 while the sheet still forms part of the stack 1. The leading edges of sheets in conventional apparatus often lie askew because the timing of disengagement of suction heads from the sheets cannot be controlled as predictably as in the apparatus and according to the method of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for transferring successive outermost sheets from a stack of sheets into a predetermined plane, particularly for transferring X-ray films, comprising a source of stacked sheets; transporting means operable to advance successive sheets in a predetermined direction in said plane; and singularizing means including a mobile support, at least one suction-operated transfer element on said support, and means for moving said support between at least one first position in which said transfer element can attract the outermost sheet in said source and a plurality of second positions in some of which said transfer element maintains at least a portion of the thus attracted sheet in said plane, said transporting means including means for engaging and advancing said sheet portion in said predetermined direction in said plane in at least one second position of said support to thereby entrain said transfer element in said predetermined direction while transfer element continues to adhere to the sheet, said moving means including means for yieldably opposing such entrainment of said transfer element in said predetermined direction.

2. The apparatus of claim 1, wherein said advancing means includes at least one pair of rotary members defining a nip which is located in said plane, said transporting means further comprising drive means for at least one of said rotary members.

3. The apparatus of claim 2, wherein said moving means includes means for maintaining said transfer element in a predetermined orientation with reference to said advancing means and said plane in each second position of said support.

4. The apparatus of claim 1, wherein said opposing means includes means for yieldably biasing said transfer element to a predetermined second position at a fixed distance from said transporting means.

5. The apparatus of claim 4, wherein said fixed distance between said transfer element and said transporting means in said predetermined second position of said transfer element is greater than in any other second position of said support.

6. The apparatus of claim 4, wherein said singularizing means comprises a plurality of aligned transfer elements each of which comprises a suction cup, said support including at least two sections one of which is movable relative to the other section to thereby enable said support to assume said plurality of second positions, said biasing means including resilient means acting upon said one section to urge the latter to a second positions corresponding to said predetermined position of said transfer element.

7. The apparatus of claim 6, wherein said other section of said support includes an elongated guide and said one section is shiftable lengthwise of said guide.

8. The apparatus of claim 1, wherein said advancing means comprises a pair of rotary members defining a nip which is located in said plane, and further comprising means for monitoring the region of said nip for the presence or absence of sheets.

9. The apparatus of claim 8, wherein said portion of the sheet in said plane has a leading edge which enters said nip in response to movement of said support to said one second position, said monitoring means being arranged to detect the presence or absence of such leading edge in said nip.

10. The apparatus of claim 9, wherein said monitoring means comprises a light-sensitive detector.

11. The apparatus of claim 10, wherein said detector is constructed for use in non-actinic light.

12. The apparatus of claim 8, wherein said rotary members define at least one gap and at least a portion of said monitoring means is installed in said gap.

13. The apparatus of claim 12, wherein each of said rotary members comprises a pair of spacedapart rolls and said gap is disposed between the rolls of said pairs.

14. The apparatus of claim 8, wherein said transporting means further comprises drive means for at least one of said rotary members, and further comprising control means for arresting the drive means in response to detection of a sheet by said monitoring means.

15. The apparatus of claim 14, wherein said singularizing means further comprises suction generating means activatable to draw air from said transfer element and aerating means activatable to admit air into said transfer element, said control means including means for deactivating said suction generating means and for activating said aerating means on detection of a sheet by said monitoring means.

16. The apparatus of claim 15, wherein said suction generating means comprises a pump.

17. The apparatus of claim 15, wherein said aerating means comprises a valve which is activatable to connect said transfer element with the atmosphere.

18. The apparatus of claim 15, wherein said control means includes means for temporarily arresting said drive means on detection of a sheet by said monitoring means for an interval of time which suffices to disengage said transfer element from the sheet in said plane in response to deactivation of said suction generating means and activation of said aerating means so that said opposing means can move said transfer element in a direction away from said transporting means.

19. The apparatus of claim 1, wherein said plane is at least substantially horizontal.

20. The apparatus of claim 1 for transferring successive outermost sheets from a stack of sheets wherein each sheet of the stack has a leading edge, as considered in said predetermined direction, wherein said transfer element is arranged to engage successive outermost sheets of the stack at a predetermined distance from the leading edge of the respective sheet and to move the thus engaged sheet in a direction which is at least substantially normal to the planes of sheets which form the stack.

21. A method of transferring successive outermost sheets from a stack of superimposed sheets into a predetermined plane, particularly of transferring X-ray films, comprising the steps of establishing a stack of sheets; attracting portions of successive outermost sheets of the stack by several suction cups; moving the suction cups so as to transfer said portions of successive outermost sheets into said plane; moving the portions of successive outermost sheets in said plane by way of the suction cups including maintaining the suction cups in a predetermined orientation; transporting said portions of successive outermost sheets in said plane in a predetermined direction while the suction cups adhere to such portions of the respective sheets so that the suction cups are moved by said portions of the respective sheets; interrupting said transporting step for a predetermined interval of time; disengaging the suction cups from the respective sheet during such interval of time; and moving the suction cups counter to said predetermined direction upon disengagement from the sheet.

* * * * *